United States Patent [19]

Hughes

[11] 4,092,755
[45] June 6, 1978

[54] HIGHLY VERSATILE DOCK TRAILER

[76] Inventor: Gary W. Hughes, 33 Vista Dr., Little Rock, Ark. 72204

[21] Appl. No.: 779,109

[22] Filed: Mar. 18, 1977

[51] Int. Cl.² ............................................. B63C 13/00
[52] U.S. Cl. ........................................ 9/1.2; 214/500; 280/80 B; 280/414 R; 296/23 B
[58] Field of Search ...................... 9/1.2; 114/45, 125, 114/263; 214/84, 500, 502; 280/80 B, 414 R, 414 A, 414 B; 296/23 B

[56] References Cited

U.S. PATENT DOCUMENTS

| | | | |
|---|---|---|---|
| 3,124,259 | 3/1964 | Goettl | 280/414 R |
| 3,169,644 | 2/1965 | Godbersen | 9/1.2 |
| 3,300,796 | 1/1967 | Powers | 9/1.2 |
| 3,403,798 | 10/1968 | Flachbarth et al. | 214/84 |
| 4,011,958 | 3/1977 | Carrick | 9/1.2 |
| 4,018,179 | 4/1977 | Rutter | 114/45 |

Primary Examiner—Trygve M. Blix
Assistant Examiner—Jesus D. Sotelo

Attorney, Agent, or Firm—Sughrue, Rothwell, Mion, Zinn and Macpeak

[57] ABSTRACT

An elongated, rectangular, open chassis frame preferably carries fore and aft hollow containers fixedly mounted to the frame and within and protected by the frame, beneath the wood decking. Flooding of the aft containers causes inclined submergence of the dock trailer unit to facilitate loading of a boat onto the wood decking fixed to the top of the chassis frame. A demountable wheel assembly includes a pair of elongated sliders which are bolted at selected positions to beams at the sides of the chassis frame to adjust the wheels to the center of gravity of the boat when trailed by the unit. Winch driven anchor bars adjustably vertically mounted to at least the rear corners of the chassis frame allow adjustment to the dock-trailer unit vertical height to jack the rear of the dock-trailer above the water level to fix the unit as a dock subsequent to unloading of the boat.

6 Claims, 10 Drawing Figures

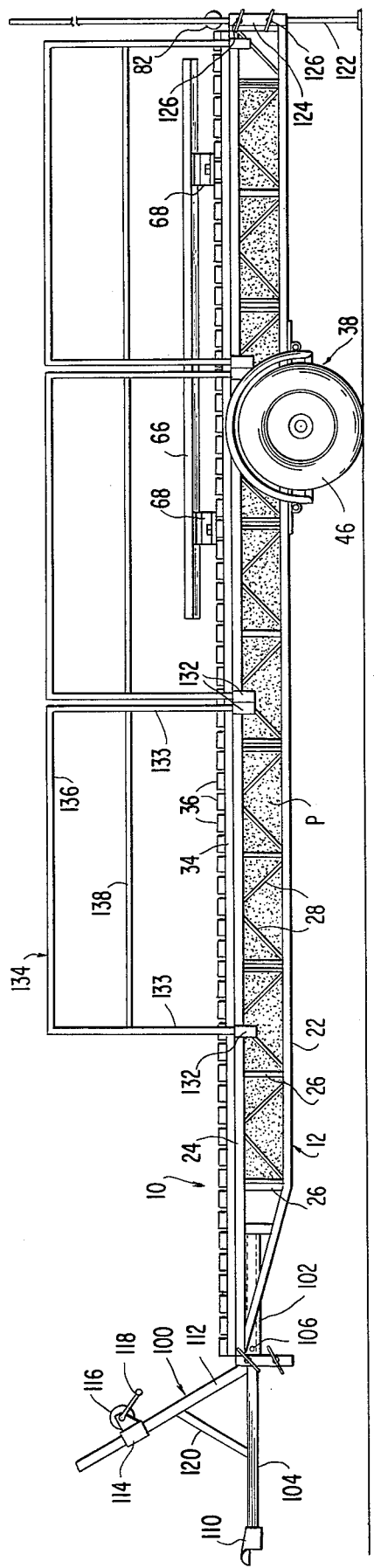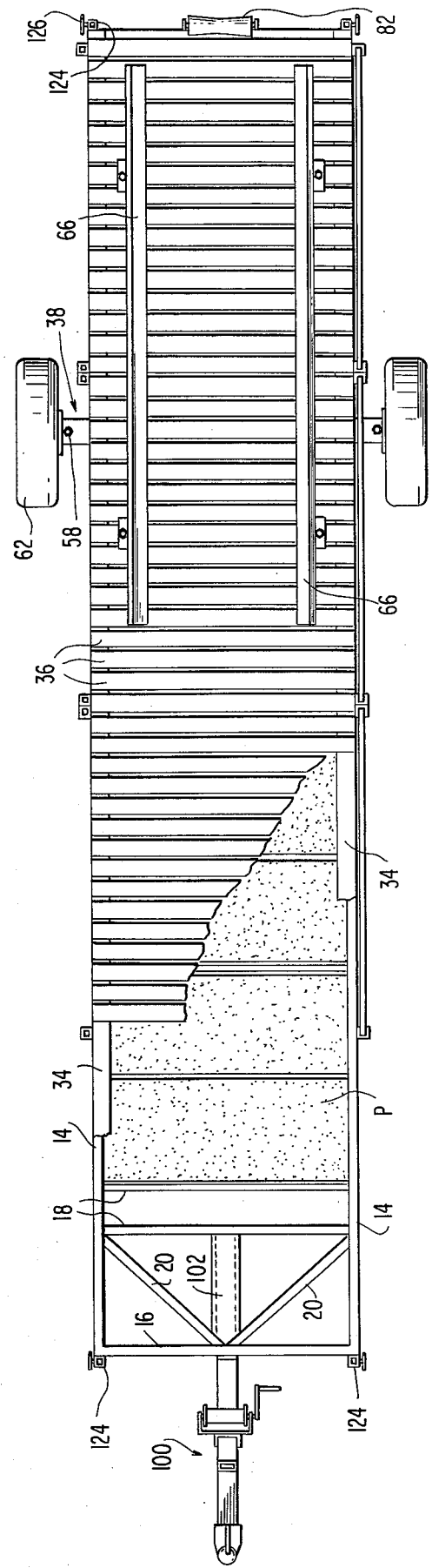

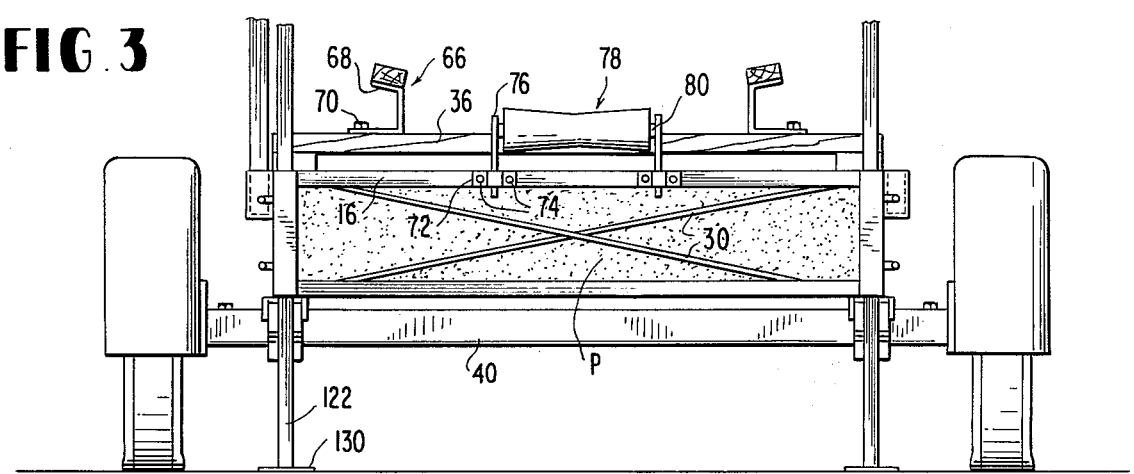
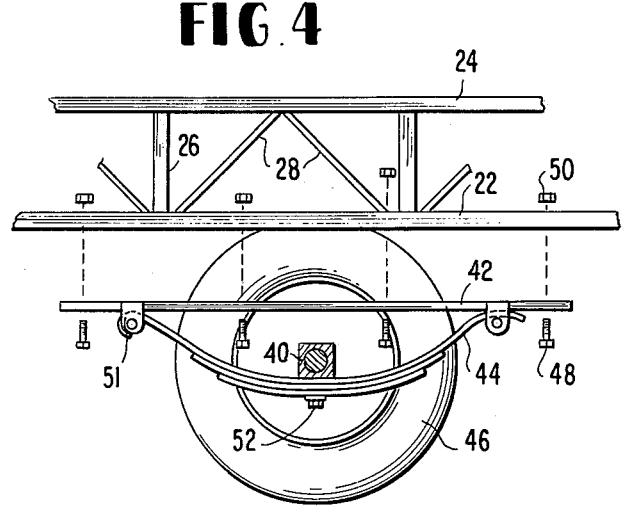
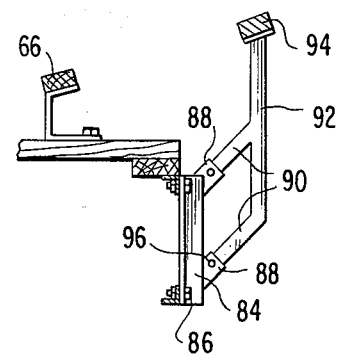
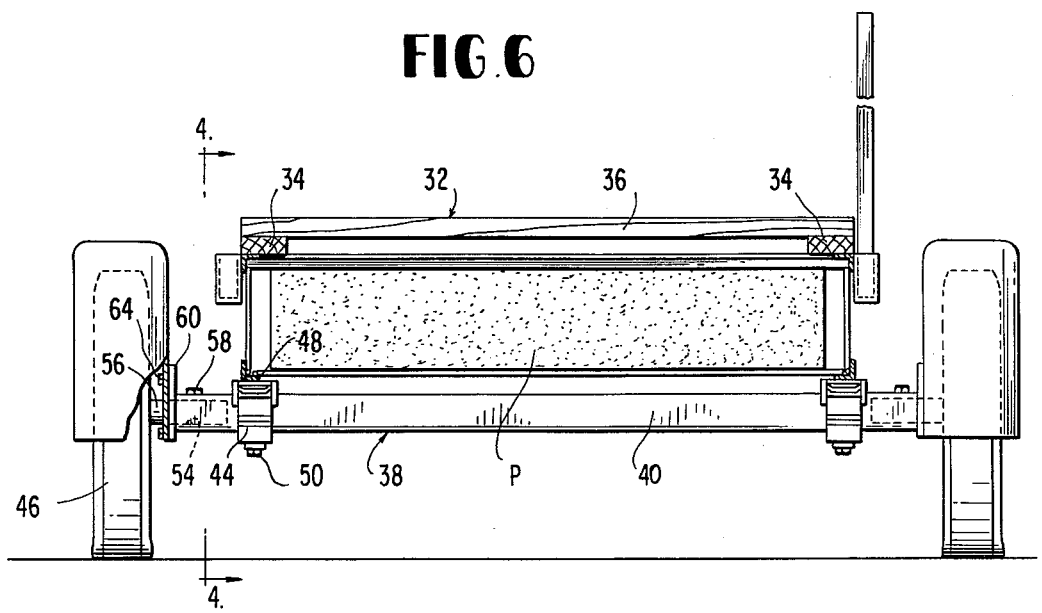

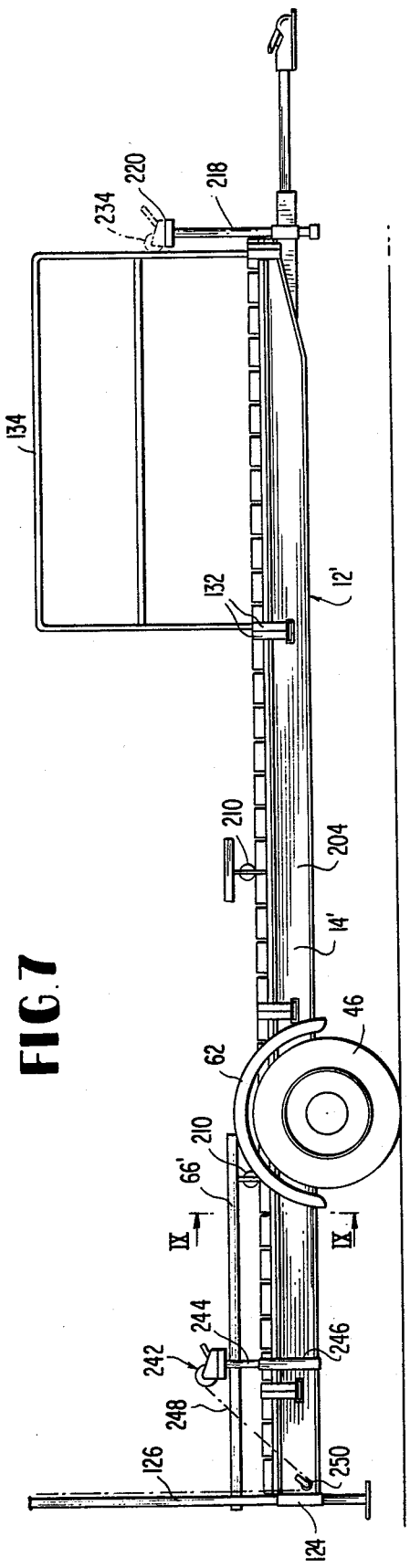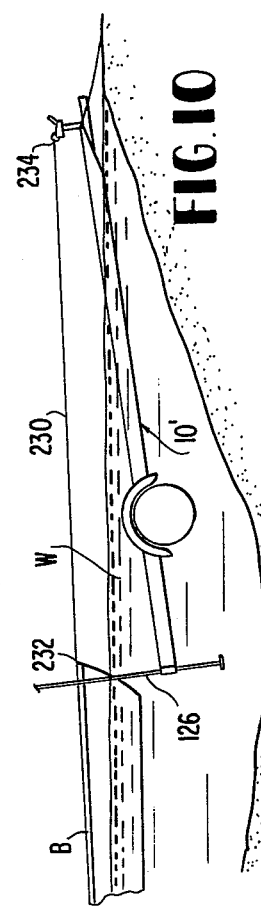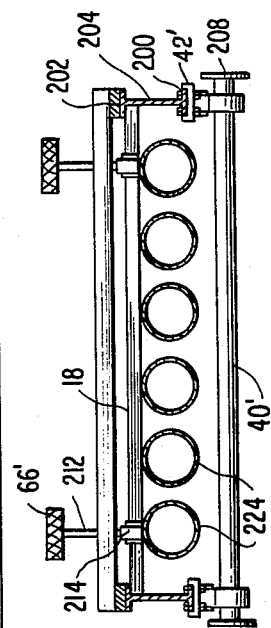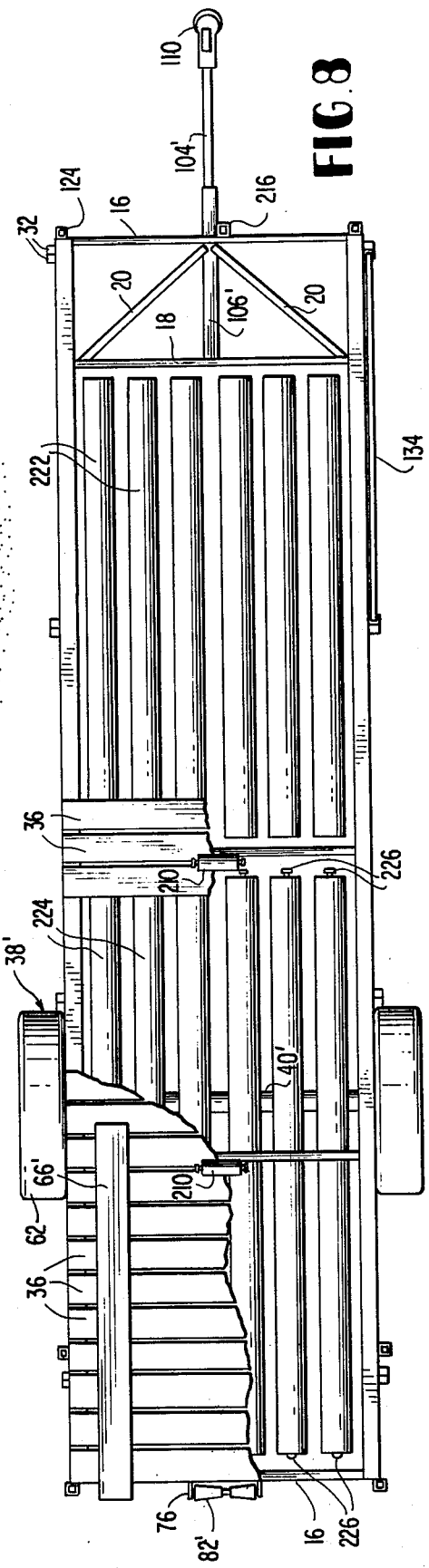

HIGHLY VERSATILE DOCK TRAILER

BACKGROUND OF THE INVENTION

1. Field of the Invention

This invention relates to boat trailers and more particularly to an improved boat trailer which subsequently serves as the boat dock after trailing the boat to a given body of water.

Attempts have been made to construct a boat trailer in such a fashion that subsequent to trailing the boat by automobile or other vehicle to a body of water where the boat is to be used, the boat trailer additionally functions as a floating dock by mooring the modified trailer at the shoreline with the front or rear projecting outwardly from the bank and floating on the surface of the water.

Representative U.S. patents showing combination structures are U.S. Pat. No. 3,124,259 issued to Goettl, Mar. 10, 1964, and U.S. Pat. No. 3,126,855, issued to Freeburg, Mar. 31, 1964. Both of these patents illustrate dock-trailer units in which the boat moves into position overlying the dock-trailer superstructure by entering a predefined horizontal slot to the center of the flotation means whereupon, subsequently when the dock-trailer is retrieved from the water by operation of the automotive vehicle, both the dock-trailer and the boat emerge from the water with the boat captured within the slot which extends below the horizontal decking of the combination unit. Such structures are inherently complex and expensive and even though, in the Freeburg unit, hinged panels may be folded downwardly subsequent to removal of the boat to provide an uninterrupted deck, such arrangement due to its cost have prevented such dock-trailer units from enjoying commercial success.

Further, in the structure of Goettl subsequent to unloading of the boat from the dock-trailer unit the superstructure of the trailer impedes the use of the unit as a dock. Further, since the wheels of the unit are at least partially immersed in the body of water when the unit is employed as a dock and since the unit may rest on the surface of the water for an extensive period of time, there can be extensive water damage to the wheel assembly particularly the wheel bearings.

It is therefore an object of the present invention to provide an improved, simplified and aesthetic combined boat trailer and boat dock which permits the boat to be satisfactorily trailed on the unit by an automotive vehicle to the site for use of the boat, permits the boat to be readily removed from the deck of the unit and allows elements such as bunks, winches, rollers and the like to be detached from the chassis so as to provide a free and unimpeded upper deck surface and which permits the ready addition of side rails or the like to one or both longitudinal sides of the unit rectangular chassis frame.

It is a further object of the present invention to provide an improved combination boat trailer and boat dock having flotation means which may be selectively flooded to permit the rear end of the trailer to be submerged and the unit inclined to facilitate loading of a boat onto the upper surface of the unit decking and to permit, after retrieving of the unit from the water, gravity draining of those flooded flotation means.

It is a further object of the present invention to provide an improved combination boat trailer and boat dock which employs vertically adjustable anchor bars at respective corners of the chassis frame for locking and anchoring of the unit to the sea bottom, adjacent the shoreline, and for forceably lifting the rear of the combination dock-trailer above the surface of the water to fix the dock and improve the unit stability when employed as a dock subsequent to launching of the boat.

From the foregoing other objects and advantages of the present invention will become readily apparent to those skilled in the art, and in particular with reference to the accompanying drawings.

SUMMARY OF THE INVENTION

The present invention comprises a unitary boat trailer and boat dock comprising an elongated, rectangular open chassis frame. Flotation members are fixedly mounted within the frame and protected thereby. Wood decking overlies the upper surface of the chassis frame and is fixed thereto. The chassis frame includes horizontal beams on each side and a wheel assembly is detachably mounted to the frame by way of a pair of elongated slider bars to which spring members are shackled at fore and aft locations for supporting the axle therebetween and transversely of the chassis frame. A plurality of bolts detachably mount the slider bars to the bottom of the chassis side beams at longitudinally adjustable positions to permit ready matching of the wheel assembly to the weight application point of the boat relative to the chassis frame which supports the same, and to permit the wheel assembly to be readily removed from the unit after launching of the boat. At least one roller is demountably carried by the chassis frame with its axis transverse to the longitudinal axis of the chassis frame and centered with respect to that chassis frame axis and a plurality of demountable bunks are carried by the chassis frame which project above the deck along both sides of guiding of the boat during loading of the boat onto the deck. A tow bar is mounted to the chassis frame at its forward end and winch means are mounted to the tow bar for winching the boat over the roller and onto the bunks. Vertically adjustable anchor bars are mounted to at least the rear corners of the chassis frame for anchoring the unit onto the bed of the body of water within which the unit resides. A demountable winch may be mounted to the chassis of the dock trailer adjacent the rear anchor bars for winching the anchor bars vertically downward and to self-lift the rear end of the unit above the water level to fix the dock subsequent to unloading of the boat. Preferably, vertically adjustable anchor bars are provided at all four corners to fixedly locate the dock within the water and adjacent the shoreline. The tow bar may comprise a unitary tongue and winch assembly which is removably mounted to the chassis frame at the forward end. Removable handrails are provided having vertical side bars which are received within tubular members fixed to the sides of the chassis frame and which telescoping receive the lower ends of the vertical side bars of the removable handrails.

BRIEF DESCRIPTION OF THE DRAWINGS

FIG. 1 is a side elevational view of the one embodiment of the improved combined boat trailer and boat dock unit of the present invention.

FIG. 2 is a top plan view, partially broken away of the embodiment of the invention shown in FIG. 1.

FIG. 3 is a rear elevational view of the unit shown in FIGS. 1 and 2.

FIG. 4 is a exploded, sectional view of the portion of the unit of FIG. 3 taken about line 4—4.

FIG. 5 is an enlarged, sectional view of a portion of the unit shown in FIG. 1 illustrating extension side bunks for permitting the trailering of an oversized boat on the trailer.

FIG. 6 is a vertical sectional view of the unit of FIG. 1 illustrating the demountable wheel assembly and its attachment to the chassis frame.

FIG. 7 is a side elevational view of a second embodiment of the present invention.

FIG. 8 is a top plan view, partially broken away, of the embodiment of the invention of FIG. 7.

FIG. 9 is a sectional view of the embodiment of FIG. 7 taken about line IX—IX.

FIG. 10 is a schematic view of the embodiment of the invention of FIG. 7 with the rear flotation tanks flooded to facilitate loading of the boat onto the combined boat trailer and boat dock.

DESCRIPTION OF THE PREFERRED EMBODIMENTS

FIGS. 1 and 7 are side elevational view of two embodiments of the present invention. Both embodiments carry like numerals identifing like elements. Turning to FIG. 1, the combination boat trailer and boat dock indicated generally at 10 comprises an open, rectangular chassis frame indicated generally at 12, the frame being formed by laterally opposed sides or truss members 14 and being joined at respective ends by crossbeams 16. Additional crossbeams 18 are employed at longitudinally spaced positions. The members 16–18, constitute rigid bar stock, angle irons or the like. Further, diagonal bracing may be employed as by the use of diagonal angle irons 20 at the forward or front end of the unit. Each of the sides or truss members are made up of a lower beam 22 and an upper beam 24, in this case the lower beam 22 angles upwardly at its forward end and terminates in contact with the upper beam 24. The parts of the chassis frame are all formed of metal and are welded together. In that respect, and relative to the trusses 14, vertical bars or angle irons are provided at 26 at longitudinally spaced positions and the truss members are reinforced by way of diagonal reinforcing members 28 which are welded at respective ends to the upper and lower beams 24 and 22 intermediate of the vertical bars 26. The crossbars 16, 18, etc. are provided at both the top and bottom of the chassis frame; that is, they extend laterally between the lower side beams 22 and the upper side beams 24, see FIG. 3, and are welded thereto. Further, diagonal crossbars 30 extend transversely, across the center of the open chassis frame, being welded at their ends to respective sides 14 of the chassis frame 12 thereby providing a relatively light-weight but rigid chassis structure. In this embodiment, in order to effect flotation, a plurality of blocks P of closed pore styrofoam or other closed pore plastic material are provided which blocks, extend throughout the longitudinal length of the chassis frame and are maintained in position by the diagonal crossbars and reinforcing rods as at 28, 30.

Since the unit is employed, after launching of the boat on site, as a temporary dock, a wooden deck is provided on the upper horizontal face of the chassis frame. Deck 32 comprises a pair of longitudinal wooden beams such as 2 × 4s or 2 × 6s as at 34, on opposite sides of the chassis frame, and, cedar deck strips 36 in the form of wooden 1 × 4s or the like are fixed at respective ends by nailing or the like to the longitudinal beams 34 to form a decking which extends over the complete upper face of the chassis frame 12. Preferably, the deck strips 36 are spaced from each other to permit water to drain, and to facilitate mounting of removable elements onto the surface of the chassis frame.

The open, rectangular chassis frame employing the open side trusses on respective sides thereof, forms a highly rigid and high strength support for the boat (not shown) in this embodiment which is moved into overlying position with respect to the deck 32 for trailing by an appropriate vehicle such as an automobile.

In that respect and forming a significant aspect of the present invention is the demountable wheel assembly indicated generally at 38. A drop axle assembly 38 comprises an axle 40 which is of a length in excess of the width of the chassis frame 12, a pair of sliders or slider bars 42 constituting elongated metal bars which are demountably mounted to respective lower beams 22 of the chassis frame sides or truss members 14, FIG. 4, springs 44 and rubber tire wheels 46. In this embodiment, the lower beam 22 is provided with a plurality of vertical holes through which project, four bolts 48 for each wheel assembly such that by threading nuts 50 onto the bolts 48 the sliders 42 are mounted to the lower beams 22 of the truss members, the longitudinal position of the wheels 46 relative to the chassis frame 12 may be readily varied by changing the bolt locations to position the wheels relative to the weight concentration of the boat being trailed. The sliders 42 carry forward and aft shackles 51 for mounting the springs 44 in place. In this embodiment, the springs 44 are fixedly mounted by way of bolts 52 to the rectangular bar 40 constituting the axle, this bar having axial holes 54 drilled within the ends of the same which receive, the wheel axle extensions 56, the axle extensions being maintained in place by set screws 58, FIG. 6. The rubber tired wheels 46 are fixedly mounted to axle extensions 56 and these in turn are telescoping received within the axial holes 54 of axle 40. The wheels 46 are rotatably mounted to axle extensions 56 with the axle extensions being locked to the ends of axle 40 by means of the set screws 58. This permits the wheels to be readily removed after launching of the boat and when employing the unit as a dock since otherwise, the wheels and particularly the wheel packings deteriorate when subjected to water immersion for an extensive period of time. Further as seen in FIG. 6, the axle 40 rigidly mounts by way of mounting plate 60 on each end thereof wheel covers or fenders 62 with the fenders covering the wheel but not interfering with the removal of the same. The fenders are bolted to the mounting plates 60 by bolts 64 such that they may be removed if desired.

In transporting the boat and in loading and unloading the same, it is necessary to facilitate the movement of the boat onto the trailer in overlying position with respect to deck 32. In this respect, the present invention is provided with demountable bunks and at least one demountable roller assembly. The bunks indicated generally at 66 comprise wooden 2 × 4s or the like which are fixed to the upper face of C brackets 68 which in turn are bolted to given deck strips or boards 36 as at 70, the bunks 66 being covered with carpeting or the like to permit the boat to be loaded without damage to the hull. A pair of U-shaped brackets 72 are mounted to the upper rear crossbar 16 by bolts 74 forming openings within which, bars 76 of roller assembly 78 project, the upper end of the bars rotatably supporting an axle 80 to which, a roller 82 is fixedly mounted, such that the roller 82 rotates about its axis. The surface of the roller is concave towards its center to center the keel of the boat as the boat is loaded onto the unit. With reference to FIG. 5, vertical brackets 84 may be bolted by way of bolts 86 to the truss members 14 at several locations, the brackets 84 bearing at the top and bottom, facing away from the chassis frame, integral open ended tubes 88, at corresponding angles and inclined upwardly, the tubes 88 receiving parallel arms 90 of a unitary extension bunk support member 92 which terminates at its upper end in an extension bunk which is carpet covered, formed by a 2 × 4 or the like at 94, the bunks 94 extending parallel to and constituting a planar extension of the bunks 66 which are fixed to the deck 32 of the unit. Set screws 96 may be employed to fix the parallel arms 90 of support member 92 within respective tubes 88 of the bracket 84, the parallel arms forming a highly rigid mounting for the auxiliary bunks 94 which permit the trailer to accommodate a boat having a width quite in excess of the lateral width of the chassis frame.

As a further aspect of the present invention in the embodiment of FIG. 1 there is employed a removable, unitary tow bar and winch assembly indicated generally at 100. The front end of the chassis frame 12 is provided at its center with a rectangular hollow metal tube 102 which is welded at respective ends to crossbars 16 and 18 underneath the same, and coaxial with the longitudinal axis of the rectangular elongated chassis frame. The assembly 100 comprises a rectangular tubular tow bar 104 of external dimensions slightly smaller than the internal dimensions of tube 102 such that the tow bar 104 telescoping slides within tube 102. In that respect, the tube 102 is provided with lateral, aligned openings or holes which extend horizontally through the sides of the tube 102 and, the tubular tow bar 104 is likewise provided with holes through the sides of the same which are alignable with the holes of tube 102 when the tow bar is inserted the full extent within tube 102 and, a lock pin 106 may be inserted through the holes when aligned to fix the tow bar and winch assembly 100 to the chassis frame. The two bar 104 terminates at its forward end in a coupler hitch 110, for instance of a size to permit coupling to a two-inch ball mounted to the rear of the automotive vehicle (not shown) which pulls the unit 10. Welded to the upper surface of the tow bar 104 is a hollow rectangular tubular winch mounting bar 112 which supports a rectangular bracket 114. Bracket 114 carries a rotatable, ratchetted drum 116. Drum 116 is rotated by means of a winch handle 118 which is fixed to and acts as an extension of the shaft rotably mounting the drum 116. This forms a conventional winch assembly pawl and ratchet lock winch assembly such that a rope (not shown) coupled to the drum 116 and at one end, and coupled to a boat (not shown) at the other end may cause the boat to move from right to left, FIGS. 1 and 2, over the roller 82 and between the bunks 66 until the boat is drawn up and rests comfortably and securely on the bunks 66 and weight centered longitudinally, with respect to the drop axle assembly 38. Preferably, bar 112 is at an angle of approximately 60° with respect to tow bar 104 and a reinforcing bar 120 is welded at respective ends to the tow bar 104 and the winch support bar 112 to form a rigid triangular mount for the winch assembly.

In both embodiments of the invention, there is provided at the four corners individual anchor bars 122, the bars 122 at the rear of the chassis frame being considerably longer than those at the front since, normally the front of the unit is anchored on the shore or adjacent the shore while the rear projects outwardly from the shoreline. In this respect, at the four corners there are provided short length rectangular tubes 124 which are welded to the sides of the ends of the truss members 12 and extend vertically such that the rectangular tubular anchor rods 122 slideably project within the same permitting the anchor rods to be projected and retracted relative to mounting tubes 124. As illustrated, a pair of set screws 126 are threaded to the tubes 124 at axially spaced locations and may be rotated to frictionally lock the anchor rods 128 in place at a preferred vertical position with respect to the chassis frame 12. As may be seen in FIG. 3, preferably the anchors 128 terminate at their lower end in foot pads 130 having a sufficient surface area to insure that the pads 130 rest on the bottom of the seabed to bear a sizable portion of the weight of the unit when employed as a fixed dock.

Along the sides of the truss members 12, there are provided additional rectangular tubes as at 132, these short length tubes being welded to the upper beams or angle arms 24 of the truss member with their axes vertical. The tubes 132 may be capped at their bottoms to form rectangular open top wells. The tubes receive the lower ends of vertical risers 133 of respective handrail assemblies 134. Assemblies 134 may comprise unitary U-shaped metal rods or members including a horizontal upper handrail 136 and may have welded between the risers 133 and lower handrail 138 which extends parallel to the upper handrail 136. As shown in the FIG. 1, three such handrail assemblies 134 are provided on the right side of the chassis frame 12 for unit 10, looking rearwardly from the forward end of the unit. Additional tubes 132 are welded to the left side of the chassis frame for receiving the same handrail assemblies should it be decided to place them on that side of the loading dock depending upon the locale of the dock after boat launch or, the tubes 132 may receive additional handrail assemblies.

Turning to FIGS. 7 through 10, inclusive, there is illustrated an alternative embodiment of the invention which is essentially the same as the prior embodiment, with respect to the major features. Like elements to the first embodiment are given like numerical designations. In this case however, the open truss members are replaced by steel I beams 14' which may be for a representative size unit 10', 8 inch steel I beams constituted by an upper horizontal wall 202 and a lower horizontal wall 200, joined by vertical wall 204. Crossbars 16 are provided at both ends, both at the top and the bottom, in like fashion to the first embodiment and at longitudinally spaced positions intermediate crossbars 18 span between the I beams and are appropriate welded at their ends to these members. Additional reinforcing is provided by way of the diagonal beams or bars 20 at the forward end of the unit 10' providing additional structural reinforcement at that end at which point the tow bar mounting tube 106' is welded and which, in this case projects forwardly of the front crossbar 16 to some extent. A tow bar 104' is telescopically carried within the tube 106' in the same manner as the prior embodiment and terminates in a ball type coupler, 110. Drop axle assemblies 38' are mounted in somewhat the same manner except in this case the axle 40' is mounted by way of springs to sliders or slider bars 42' and terminate in hubs 208 at respective ends outside of the sliders 42' to which the wheels 46 are directly mounted, the axle in this case rotating with the hubs. The principal difference here is that since the truss members have been replaced by steel I beams, the sliders are mounted to the I beam lower horizontal wall 200 by having holes drilled through the lower wall on opposite sides of the vertical wall 204 which joins the lower wall for each I beam to its upper horizontal wall 202. In like fashion to the prior embodiment, a number of series of holes are drilled within the lower wall to permit the sliders to be horizontally mounted to the I beam at longitudinally adjustable positions so that the wheel or drop axle assembly 38' is located at the best possible position to support the road during transport of the boat B, FIG. 10.

Again, the deck 32 comprises a plurality of transversely extending parallel and longitudinally spaced deck strips or boards 36 which are fixed at respective ends to the longitudinal boards 34 as in the prior embodiment. The decking covers the complete length of the chassis frame 12' and removably supports a plurality of roller assemblies 210 intermediate of the ends of the chassis frame while, at the rear there is provided a concave roller 82' mounted by way of support bars 76 in the same fashion as the prior embodiment. Paired bunks 66' are provided at the rear of the unit and are at opposite lateral sides. However, in this case, the bunks 66' are fixed at their bottoms to support rods 212 which are received within tubes 214 which are welded to a crossbar 18, FIG. 9. A short rectangular tube 216 is welded to horizontal tube 106' through which projects the tow bar 104', the short tube 216 being welded thereto at right angles and extending vertically with respect to the chassis frame. Slideably mounted within tube 216 is a vertically adjustable leg or a rectangular rod 218 on whose upper end, is fixed the main boat winch assembly 220 for winching the boat B onto the unit from its rear end forwardly as seen in FIG. 10 after, the unit 10' is submerged or partially submerged into the body W of water adjacent the shoreline.

An important aspect of the embodiment of this invention is the type of flotation means and the selectivity to which flotation is given to the unit. In this respect, this illustrated embodiment employs a plurality of front and rear flotation tubes which may be of plastic, metal or the like as at 222, 224, respectively which for illustration purposes are essentially equal to approximately one half the lenght of the open chassis frame 12. The tubes 222, 224 are suitably supported by being welded to crossbars 18 or the like, with the front tubes 222 being sealed off at both ends. The ends of the tubes 224 at the rear of the chassis frame are closed off by removable plugs 226. Tubes 224 carry removable plugs at least at their rear ends, although both ends may carry such plugs. The plugs may be threaded about the periphery so as to threadably close off the ends of the tubes 224 but in any case, by removing the plugs 226, water is permitted to enter the flotation tubes 224 at the rear of the unit thereby reducing the overall floatability and in fact causing the rear end of the unit 10' to sink. This permits by reference to FIG. 10, the tow rope as shown at 230 having one end attached to the bow of the boat as at 232 and the other end attached to the winch drum or reel 234 whereby, upon operation of the winch 220, the boat B moves over the rear of the partially submerged unit 10' riding on the series of rollers 82' and 210 to the position where, it is properly positioned or oriented longitudinally with respect to the unit 10' whereupon, the automobile which is hitched (not shown) to the tow bar 104' pulls the wheeled unit 10' and the boat B from the water. With the plugs 226 removed from the rear flotation tubes 224 the water simply drains out and the plugs 226 may be recoupled to the rear ends of tubes 224 sealing off the tubes and permitting full flotation of the unit by both the forward and aft tubes whereupon. The unit will thus float in a horizontal position, that is without inclination. It should be stated, that the unit may be towed by the boat subsequent to launching with the tubes 222 and 224 filled with air and sealed from the water. This permits the dock-trailer to be moved by water from place to place. However, with the embodiment shown in FIGS. 7 through 10 inclusive, it is evident that once the tubes 224 are opened the unit must be towed back onto land to permit the drainage. Vertical tubes 132 permit handrail assemblies 134 to be mounted to the sides of the unit in similar fashion to the first embodiment. Further, as before the four corners carry anchor bars 126 and permit their vertical adjustment to anchor both ends of the unit in place under water when employed as a dock subsequent to unloading of the boat B.

Further, with respect to the second embodiment, a short length hollow rectangular tube 246 is mounted to each side of the I beams 14' near the rear of the unit and behind the drop axle assembly 38' these constituting winch mounts. Winch 220 or additional winches as at 242 may be employed and mounted by means of mounting rods 244 to winch tubes 246 and the winch line 248 may be fed through an appropriate pulley 250 located adjacent to the tubes 124 mounting the rear anchor bar 126. The line 248 may be fixed to the top of the anchor rod 126 so that by winching, the bars may be projected downwardly to the point where they engage the sea bottom. In addition, by utilization of winch 242 or by shifting winch 220 to that position and making the attachment to the upper end of the rear anchor bars 126 respectively, the combined boat trailer and boat dock may be winched and lifted above the surface of the water at the rear, by forcing the bars 126 vertically downwardly within tubes 124 via winches 242, thus stably fixing the location of the unit 10' to resist movement under the tide and wave action. All the elements are self-contained, most of them are removable and this permits a highly versatile combination trailer and dock.

Additional modifications and changes may be made to both embodiments. For instance a motor transom may be mounted to the rear end of the unit so that the dock may be used in fact as a marine vehicle and motored from place to place rather than by towing it with the boat.

In an exemplary form, the dock-trailer unit may be five feet wide by twenty feet in length (deck measurement). In the illustrated embodiment, six inch IDPVC plastic tubing constitutes the flotation means both in terms of the permanently sealed front flotation tubes 222 and the removable plug rear flotation tubes 224. The axle for such unit may be rated for 3,500 pound support and has a four inch drop. The axle demounts by loosening of all four bolts to each side of the I beam for each of the slider bars. While, the rear flotation tubes are shown as being plugged by a four-inch diameter screw-type plugs, for approximate venting at the forward end, a smaller plug of approximately one-inch diameter may be employed, this being of by the diameter of a resilient element is increased to frictionally seal the plug within a one-inch diameter opening of the plate capping off that end of the tube. Alternatively, rectangular plastic canisters or containers may be employed for flotation. In the embodiment of the invention as shown in FIG. 1 which is used principally for dock purposes, styrofoam of the sealed pore variety may be employed.

Further while the wood deck is made of wooden 2 × 4s fixed by 1 × 4 inch boards at both ends and in five foot lengths permitting a space between pallets for dropping bunks and rollers, changes may be made without materially affecting the scope of the invention. Again, the number of rollers, their size and the number and size of the bunks may readily vary for different size boats without affecting the present invention. The handrails and other elements are shown of square metal tubing which may be changed readily to round type for ease in fabrication and for facilitating the demountability of such units. With the bunks in place and the rails in place, the bunks may readily act as seats for the dock and the handrails as backrests as may be readily seen in viewing the unit from above, FIG. 2. Fiberglas or plastic rectangular tanks may replace the tubular flotation tanks of the embodiment of FIG. 2. Paired thermos plugs may be carried at the lower corners and either simple vent openings at the upper corners or vent openings with removable sealed caps may be employed. The plugs when removed, permit the entry of water, facilitated by the vent openings, and permit the air to escape for ready sinking of the rear end of the dock-trailer while, during removal of the from the water, the openings permit ready gravity draining of the water from the flooded flotation tanks.

It is to be understood that applicant's invention has been described by way of illustration and not limitation and that modifications can be made without departing from the scope and spirit of applicant's invention.

What is claimed is:

1. An improved, combined trailer and dock unit, said unit comprising an elongated rectangular, open chassis frame, flotation members fixedly mounted within said frame opening and protected by said chassis frame, wood decking fixed to the upper surface of the chassis frame and overlying said flotation members, said chassis frame including horizontal bottom beams on each side thereof, a drop axle wheel assembly for detachably mounting to said frame, each wheel assembly comprising a pair of elongated slider bars, spring members shackled to said slider bars and depending therefrom, wheels mounted to the spring members and means for detachably mounting said slider bars to the bottom of said chassis frame side beams at longitudinally adjustable positions, demountable bunks carried by said chassis frame and projecting above said deck for guiding a boat longitudinally therebetween during loading of the boat onto said unit, at least one roller means demountably carried by said chassis frame adjacent the rear end of the unit and projecting above the deck for contact with the boat keel during movement of the boat longitudinally into overlying position with respect to the unit deck, a tow bar means, means for mounting said tow bar means to the front end of said chassis frame at the center thereof, winch means mounted to said towbar means for winching the boat over said roller means and onto said bunks, vertically adjustable anchor bars mounted to at least the rear corners of said chassis frame for vertical movement relative to said chassis frame for jacketing the rear of said trailer-dock unit above the water level to permit the unit to act as a fixed dock within the water, subsequent to unloading of a boat therefrom, means for removably mounting a winch including a winch line adjacent to each of said vertically adjustable anchor bars, and pulleys fixed to said chassis frame adjacent the vertically adjustable anchor bars; whereby, by attachment of the end of a winch line to the upper end of the vertical anchor bar and by leading said line through said pulley, operating said winch forcibly drives the vertically adjustable anchor bars vertically downward into the sea bottom to lift the rear end of said dock-trailer unit.

2. The unit as claimed in claim 1 wherein, vertically adjustable anchor bars are provided at all four corners of the chassis frame.

3. The unit as claimed in claim 2 wherein said flotation members comprise hollow containers located at fore and aft ends of said chassis frame respectively and said unit further comprises means for selectively venting said aft hollow containers to permit water to fill the aft containers and to submerge the rear end of said unit to incline the unit rearwardly and facilitate loading of a boat onto the trailer-dock unit by operation of said winch means carried by said tow bar.

4. The unit as claimed in claim 1 wherein said flotation members comprise hollow containers located at fore and aft ends of said chassis frame respectively and said unit further comprises means for selectively venting said aft hollow containers to permit water to fill the aft containers and to submerge the rear end of said unit to incline the unit rearwardly and facilitate loading of a boat onto the trailer-dock unit by operation of said winch means carried by said tow bar.

5. The unit as claimed in claim 4 wherein said hollow containers comprise cylindrical plastic tubes and said tubes, at the forward end of said and at the rear end of said chassis frame comprise threaded end plugs for selective venting and flooding said aft containers.

6. The unit as claimed in claim 1 further comprising a plurality of short length vertical tubes welded to the sides of said chassis frame at longitudinally spaced positions and said unit further comprises a plurality of tubular metal handrail assemblies including vertical risers whose lower ends are received within said respective vertical tubes and at least one horizontal handrail member joined at respective ends to respective vertical riser tubes at their upper ends, and wherein said handrails extend along the side at least one side of said chassis frame spaced from said bunks such that said bunks form seats on said dock and said handrails provide backrests with respect thereto.

* * * * *